United States Patent
Seo

(10) Patent No.: US 10,648,476 B2
(45) Date of Patent: May 12, 2020

(54) TURBO AIR BLOWER HAVING WATERPROOF AND DAMP-PROOF FUNCTIONS

(71) Applicant: TURBOWIN CO., LTD., Cheongju-si, Chungcheongbuk-do (KR)

(72) Inventor: Hyun Gyo Seo, Daegu (KR)

(73) Assignee: TURBOWIN CO., LTD., Cheongju-si, Chungcheonbuk-do (KR)

( * ) Notice: Subject to any disclaimer, the term of this patent is extended or adjusted under 35 U.S.C. 154(b) by 223 days.

(21) Appl. No.: 15/761,905

(22) PCT Filed: Jul. 27, 2016

(86) PCT No.: PCT/KR2016/008190
§ 371 (c)(1),
(2) Date: Mar. 21, 2018

(87) PCT Pub. No.: WO2017/065396
PCT Pub. Date: Apr. 20, 2017

(65) Prior Publication Data
US 2018/0266425 A1    Sep. 20, 2018

(30) Foreign Application Priority Data

Oct. 15, 2015 (KR) .................. 10-2015-0143976

(51) Int. Cl.
| | | |
|---|---|---|
| F04D 25/08 | (2006.01) |
| F04D 29/70 | (2006.01) |
| F04D 29/58 | (2006.01) |
| F04D 29/44 | (2006.01) |
| F04D 29/66 | (2006.01) |
| B01D 46/00 | (2006.01) |
| F04D 29/60 | (2006.01) |
| F04D 25/06 | (2006.01) |

(52) U.S. Cl.
CPC ........... *F04D 25/08* (2013.01); *F04D 29/441* (2013.01); *F04D 29/58* (2013.01); *F04D 29/661* (2013.01); *F04D 29/70* (2013.01); *B01D 46/003* (2013.01); *B01D 2273/30* (2013.01); *F04D 25/06* (2013.01); *F04D 29/5806* (2013.01); *F04D 29/601* (2013.01); *F05D 2260/60* (2013.01); *F05D 2260/608* (2013.01)

(58) Field of Classification Search
None
See application file for complete search history.

(56) References Cited

FOREIGN PATENT DOCUMENTS

| | | |
|---|---|---|
| JP | 2003-214397 A | 7/2003 |
| KR | 10-0572850 B1 | 4/2006 |
| KR | 10-2008-0099025 A | 11/2008 |
| KR | 10-2011-0124909 A | 11/2011 |
| KR | 10-1123655 B1 | 3/2012 |

*Primary Examiner* — Amber R Orlando
*Assistant Examiner* — Phillip Y Shao
(74) *Attorney, Agent, or Firm* — Rabin & Berdo, P.C.

(57) ABSTRACT

The present invention relates to a turbo air blower having waterproof and damp-proof functions. The turbo air blower has a waterproof structure so as to be installed outdoor, thereby obviating the need to add a pressure-feeding line and manufacture an air blower room which are required for conventional indoor installation. Further, the turbo air blower has a reliable damp-proof function by installing various dehumidifying parts therein, thereby being capable of preventing a device from being corroded by humidity and dampness as well as providing dehumidified pressure-fed air.

3 Claims, 1 Drawing Sheet

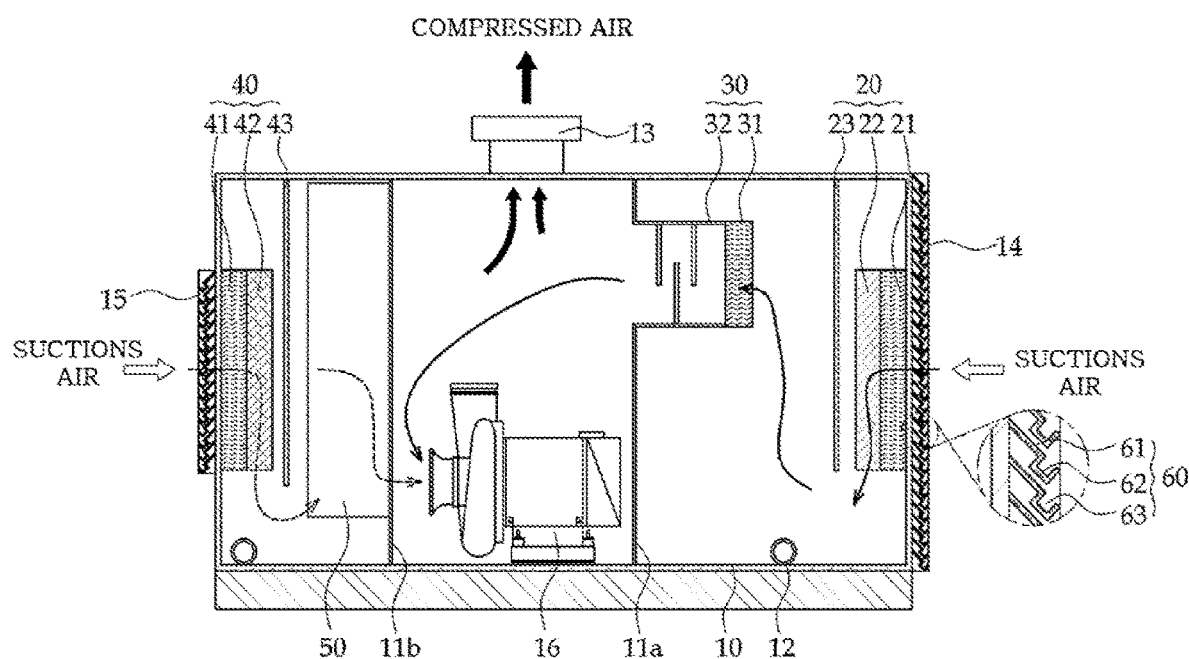

TURBO AIR BLOWER HAVING WATERPROOF AND DAMP-PROOF FUNCTIONS

TECHNICAL FIELD

The present invention relates to a turbo air blower that has an improved structure to be installed outside and that has various damp-proof functions together with a waterproof function to be able to dehumidify air flowing inside.

BACKGROUND ART

Generally, in case of an air bearing turbo blower, by its nature, it is designed to inhale an outside air to be compressed, and then transfer it to the supply object client.

Such a turbo blower has been used in various fields such as a waste water treatment process (waste water oxygen supplying and filtering, and tank cleaning etc.), a raw material pressure transport (transport of raw material having powder or bulk shape), a cement production process (cement, limestone, coal powder transport, and treatment of combustion gas and dust in heat-treating step), a thermal electric power (desulfurization process of coal dust, fly-ash, and fuel gas), a purification process (air supply of ozone device and filter washer), food and drug treatment process (transport of dry cargo, food and beverage, and medicine etc.), a chemical and petrochemical process (gas transmission and compression process), a metal process and mining (iron and ferrous transport and oxidation treatment, sludge filter drying, and cast waste water treatment) and so on.

Especially, in case of the air bearing turbo blower used in waste water/sewage water treatment plant, owing to the structural characteristics thereof, there is a big difference in composition rate of the electrical parts, rather than the mechanical parts. Accordingly, it has no choice but to be used in only the indoor.

In this case, since pressure lines (external pipe and duct etc.) for transferring the compressed air should be additionally installed over a long distance, there is problem in high cost expenditure and inefficient use.

In addition, where the conventional air bearing turbo blowers used in only the indoor is used in the outdoor, since the rain water is penetrated into the apparatus if it rains, there is a problem in that an electrical short occurs in the internal motor or the devices can be corroded due to the moisture penetration. In order to prevent the problem, it should install an additional blower or it is necessary to progress a piping work of hundreds of meters. Also, there is a problem of additional power waste due to the pressure loss.

DISCLOSURE

Technical Problem

The present invention has been made in an effort to solve the above problem and an object of the present invention is to provide a turbo air blower having waterproof and damp-proof functions that allows for reducing installation costs for installing additional delivery lines and preparing an installation place and the like for an air bearing turbo air blower that has been used only indoors in the related art by adding a waterproof function to an air bearing turbo air blower, which was impossible in the related art, that can be used with high efficiency without a limit in installation place, and that has a damp-proof function by including various dehumidifying unit.

Other objects and advantages of the present invention will be described below through embodiments of the present invention. Further, the objects and advantages of the present invention will be achieved by the components described in claims and combinations of the components.

Technical Solution

According to one aspect of the present invention so as to accomplish these objects, there is provided to a turbo air blower having waterproof and damp-proof functions including: a turbo air blower (16) that is disposed in a waterproof housing (10) to suction and compress external air and discharge the air to the outside; a first dehumidifying unit (20) that is disposed in the housing (10) to correspond to a first intake port (14) at a first side of the housing (10) and dehumidifies air suctioned inside by the turbo air blower (16); a second dehumidifying unit (30) that secondarily dehumidifies the air that has passed through the first dehumidifying unit (20) before the air flows into the turbo air blower (16); a third dehumidifying unit (40) that is disposed in the housing (10) to correspond to a second intake port (15) at a second side of the housing (10) and dehumidifies induction air induced to the turbo air blower (16) through the second intake port (15), using suction air flowing inside through the turbo air blower (16) and the first intake port (14); and a control unit (50) that is disposed between the third dehumidifying unit (40) and the turbo air blower (16) in the housing (10) to control the turbo air blower (16) and is cooled by induction air induced through the second intake port (15) and the third dehumidifying unit (40).

Advantageous Effects

As described above, according to the present invention, an air bearing turbo air blower is given a waterproof function, so the turbo air blower can be installed outdoors.

Further, since the turbo air blower can be installed outdoors, there is no need for additional delivery lines for indoor installation, so the installation cost is reduced.

Further, the turbo air blower can be installed at various places to be used in various fields without a limit in installation place.

Further, since a plurality of dehumidifying units is disposed in the turbo air blower, high damp-proof efficiency can be achieved.

BRIEF DESCRIPTION OF DRAWINGS

The above and other objects, features and advantages of the present invention will be more apparent from the following detailed description taken in conjunction with the accompanying drawings, in which:

FIG. 1 is a conceptual view showing an example of a turbo air blower having waterproof and damp-proof functions in accordance with one embodiment of the present invention.

REFERENCE SIGNS LIST

10: housing
11a, 11b: separation wall
12: drain
13: exit
14: first intake port
15: second intake port
16: turbo air blower 20: first dehumidifying units
21, 31, 41: dehumidifier
22, 42: filter
23, 43: humidity block
30: second dehumidifying unit
32: dehumidifying filter unit
40: third dehumidifying unit
50: control unit
60: rain blocks
61: block members
62: discharge guides
63: channels

BEST MODE

Mode for Invention

Before describing embodiments of the present invention in detail, it will be understood that the present invention is not limited to the configurations and arrangements of the components described below and shown in drawings. The present invention may be accomplished by other embodiments in various ways. Expressions and predicates stated herein in association with terms such as a device and directional terms (for example, "front", "back", "up", "down", "top", "bottom", "left", "right", and "lateral") are used only for simplifying the following description, and it does not mean that related devices and elements should simply have specific directions. Further, terms such as "first" and "second" are used in the detailed description and claims, but are not intended to means relative priority or object.

The present invention has the following characteristics to achieve the objects.

Hereinafter, exemplary embodiments of the present invention are described in detail with reference to the accompanying drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, the configurations described in the embodiments and drawings of the present invention are merely most preferable embodiments, and do not represent all of the technical spirit of the present invention. Thus, the present invention should be construed as including all the changes, equivalents, and substitutions included in the spirit and scope of the present invention at the time of filing this application.

An embodiment of the present invention includes: a turbo air blower (16) that is disposed in a waterproof housing (10) to suction and compress external air and the discharge the air to the outside; a first dehumidifying unit (20) that is disposed in the housing (10) to correspond to a first intake port (14) at a first side of the housing (10) and dehumidifies air suctioned inside by the turbo air blower (16); a second dehumidifying unit (30) that secondarily dehumidifies the air that has passed through the first dehumidifying unit (20) before the air flows into the turbo air blower (16); a third dehumidifying unit (40) that is disposed in the housing (10) to correspond to a second intake port (15) at a second side of the housing (10) and dehumidifies air induced to the turbo air blower (16) through the second intake port (15), using air flowing inside through the turbo air blower (16) and the first intake port (14); and a control unit (50) that is disposed between the third dehumidifying unit (40) and the turbo air blower (16) in the housing (10) to control the turbo air blower (16) and is cooled by air induced through the second intake port (15) and the third dehumidifying unit (40).

The first and third dehumidifying units (20 and 40) respectively include: dehumidifiers (21 and 41) that are disposed on an inner side of the housing (10) and remove humidity from air flowing inside; filters (22 and 42) that are disposed on one surface of the dehumidifiers (21 and 41) and filter out foreign substances in the air with humidity removed; and humidity blocks (23 and 43) that are disposed in the housing (10) to face the filters (22 and 42) with a predetermined distance therebetween.

The second dehumidifying unit (30) includes: a dehumidifying filter unit (32) that is disposed on a separation wall (11a) dividing the inside of the housing (10) into a plurality of spaces and protrudes from the separation wall (11a) toward the first dehumidifying unit (20) to dehumidify the air that has passed through the first dehumidifying unit (20); and a dehumidifier (31) that is disposed on a side of the dehumidifying filter unit (32) to dehumidify the air that has passed through the first dehumidifying unit (20) before the air passes through the dehumidifying filter unit (32).

Rain blocks (60) are disposed at the first and second intake ports (14 and 15), respectively. The rain blocks (60) have: a plurality of block members (61) inclined downward and sequentially arranged with a gap therebetween; and discharge guides (62) formed by bending the lower ends of the block members (61) to form longitudinal channels (63) so that water and rainwater flowing down on the block members (61) are collected in the channels (63) to be discharged outside without flowing into the housing (10).

A turbo air blower having waterproof and damp-proof functions according to an embodiment of the present invention is described in detail with reference to FIG. 1.

The turbo air blower having waterproof and damp-proof functions according to an embodiment of the present invention includes the turbo air blower (16), the first dehumidifying unit (20), the second dehumidifying unit (30), the third dehumidifying unit (40), and the control unit (50).

The turbo air blower (16) is fixed in the housing (10) having an empty casing shape and is operated to suction and compress external air and supply the compressed air under pressure to various places requiring the compressed air.

The housing has the first intake port (14) at the first side, the second intake port (15) at the second side, and an exit at the top.

Accordingly, though will be described below, when the turbo air blower (16) is operated and suctions air through the first intake port (14), external air is further suctioned through the second intake port (15) by the suction of air through the first intake port, and the air suctioned through the first and second intake ports (14 and 15) is compressed and then sent to places requiring the air through the exit (13).

For the convenience of description, the air that flows inside though the first intake port (14) is referred to as 'suction air' and the air that flows inside through the second intake port (15) is referred to 'induction air'. However, it is obvious that the suction air and the induction air are both external air.

The turbo air blower (16) is an air bearing-typed turbo air blower (16) and since the air bearing-typed turbo air blower (16) is well known in the art, it is not described in detail herein. Further, the turbo air blower (16) is disposed at the lower middle portion in the housing (10) and separation walls (11a and 11b) are disposed at both sides from the turbo air blower (16) such that the walls communicate with the turbo air blower (16), whereby the inside of the housing can be divided.

Depending on embodiments of users, the control unit (50) is disposed on one (11*b*) of the separation walls (obviously, even if the control unit is disposed on the separation wall (11*b*), both sides from the separation wall (11*b*) communicate with each other, so the air in the space with the control unit can flow into the space with the turbo air blower (16)), and the second dehumidifying unit (30) is disposed on the other separation wall (11*a*).

Drains 12 may be formed around the housing (10) so that water condensed and dropping down to the bottom from the first, second, and third dehumidifying units (20, 30, and 40) to be described below, water produced by moisture hitting against the humidity blocks (23 and 43) to be described below, flowing down on the humidity blocks (23 and 43), and then dropping down to the bottom, or water condensed and collected on the bottom in the housing (10) can be discharged out of the housing (10). A motor pump for easily discharging the water to the outside may be further provided.

The rain blocks (60) are disposed outside the first and second intake ports (14 and 15) of the housing (10) to prevent rainwater from flowing inside together with air. In the rain blocks 60, the block members (61) are formed in the inclined downward shape like '\' or '/' and sequentially arranged downward in parallel with each other. Accordingly, when air flows into the housing, the air flows between the block members (61) without directly flowing into the first and second intake ports (14 and 15).

In the rain blocks (60) (in detail, at the lower ends of each block members (61)), the discharge guides (62) are formed at the lower ends by bending several times in a scoop shape to form the longitudinal channels (63) so that rainwater flowing down on the block members (61) is prevented from directly flowing into the housing (10) due to air flowing inside. The rainwater flowing down on the block members (61) is collected in the channels (63) of the discharge guides (62), flows in a direction through the channels (63), and is then discharged.

The first dehumidifying unit (20) is disposed to correspond to the first intake port (14) formed at the first side of the housing (10), that is, disposed in the housing (10) to correspond to the first intake port (14).

The third dehumidifying unit (40) is disposed to correspond to the second intake port (15) formed at the second side of the housing (10), that is, disposed in the housing (10) to correspond to the second intake port (15).

The first and third dehumidifying units (20 and 40) have the same structure and respectively includes the dehumidifiers (21 and 41), the filters (22 and 42), and the humidity blocks (23 and 43).

The dehumidifiers (21 and 41) are attached to the inner sides of the housing (10) to correspond to the first intake port (14) and the second intake port (15), respectively, thereby removing humidity in external air (air) flowing into the intake ports.

The filters (22 and 42) are, on first sides, attached to second sides of the dehumidifiers (21 and 41) disposed on the inner sides of the housing (10) to be able to filter out foreign substances in the air with humidity somewhat removed through the dehumidifiers (21 and 41).

The humidity blocks (23 and 43) are disposed at predetermined distance from the filters (22 and 42) vertically from the top of the housing in order to be able to block the air that has passed through the dehumidifiers (21 and 41) and the filters (22 and 42), or to primarily remove humidity that air has even after passing through the dehumidifiers (21 and 41) and the filters (22 and 42).

Accordingly, external air is primarily dehumidified through the first and third dehumidifying units (20 and 40) and then suctioned.

However, the air flowing inside through the first intake port (14) and the passing through the first dehumidifying unit (20) is suction air that is suctioned when the turbo air blower (16) is operated. When the suction air is suctioned to the turbo air blower (16), external air (induction air) that flows inside through the second intake port (15) due to the suction force of the suction air and then passes through the third dehumidifying unit (40) is also suctioned to the turbo air blower (16).

The second dehumidifying unit (30) is disposed on the separation wall (11*a*) in the housing (10) (the separation wall (11*a*) disposed between the turbo air blower (16) and the first dehumidifying unit (20)) and is composed of the dehumidifying filter unit (32) and the dehumidifier (31).

The dehumidifying filter unit (32) protrudes toward the first dehumidifying unit (20) from the separation wall (11*a*) and the dehumidifier (31) is disposed on a side of the protrusive dehumidifying filter unit (32).

That is, the suction air primarily dehumidified through the first dehumidifying unit (20) passes through the second dehumidifying unit (30) before reaching the turbo air blower (16), and then keeps flowing to the turbo air blower (16) beyond the separation wall (11*a*).

First, the suction air that has passed through the first dehumidifying unit (20) is dehumidified while flowing into the dehumidifying filter unit (32) through the dehumidifier (31) on a side of the dehumidifying filter unit (32), and the air that has passed through the dehumidifier (31) is dehumidified through the dehumidifying filter unit (32) and then keeps flowing to the turbo air blower (16).

That is, the second dehumidifying unit (30) secondarily dehumidifies the suction air primarily dehumidified through the first dehumidifying unit (20).

Further, the dehumidifying filter unit (32) may include a plurality of filters sequentially, vertically, and alternately arranged in a zigzag shape in the space of the dehumidifying filter unit (32), depending on various embodiments by users.

The control unit (50) is disposed on the separation wall (11*b*) disposed between the third dehumidifying unit (40) and the turbo air blower (16) and may be an electric/electronic control panel, that is, a control panel.

The control unit (50) is electrically connected to an operation panel outside the housing (10) and also electrically connected to the turbo air blower (16) to be able to control turning on/off and blowing speed and time of the turbo air blower (16).

Since the control unit (50), as described above, is disposed between the third dehumidifying unit (40) and the turbo air blower (16), when the turbo air blower (16) is operated and air is suctioned through the first intake port (14), cooling that removes the heat generated by the operation is achieved by the air flowing inside through the second intake port (15) (air dehumidified through the third dehumidifying unit (40) after flowing inside).

That is, induction air is suctioned through the second intake port (15) by the suction force of the suction air that is suctioned through the first intake port (14), and the induction air cools the control unit (50) by passing through the control unit (50) when it is suctioned.

While the present invention has been described with respect to the specific embodiments, it will be apparent to those skilled in the art that various changes and modifications may be made without departing from the spirit and scope of the present invention as defined in the following claims.

INDUSTRIAL APPLICABILITY

According to the present invention, an air bearing turbo air blower is given a waterproof function, so the turbo air blower can be installed outdoors, and since the turbo air blower can be installed outdoors, there is no need for additional delivery lines for indoor installation, so the installation cost is reduced. Accordingly, it can be usefully utilized in a turbo air blower or turbo blower.

What is claimed is:

1. A turbo air blower having waterproof and damp-proof functions comprising:
   a turbo air blower (16) that is disposed in a waterproof housing (10) to suction and compress external air and discharge the air to the outside;
   a first dehumidifying unit (20) that is disposed in the housing (10) to correspond to a first intake port (14) at a first side of the housing (10) and dehumidifies air suctioned inside by the turbo air blower (16);
   a second dehumidifying unit (30) that secondarily dehumidifies the air that has passed through the first dehumidifying unit (20) before the air flows into the turbo air blower (16);
   a third dehumidifying unit (40) that is disposed in the housing (10) to correspond to a second intake port (15) at a second side of the housing (10) and dehumidifies induction air induced to the turbo air blower (16) through the second intake port (15), using suction air flowing inside through the turbo air blower (16) and the first intake port (14); and
   a control unit (50) that is disposed between the third dehumidifying unit (40) and the turbo air blower (16) in the housing (10) to control the turbo air blower (16) and is cooled by induction air induced through the second intake port (15) and the third dehumidifying unit (40),
   wherein the second dehumidifier (30) includes:
      a dehumidifying filter unit (32) that is disposed on a separation wall (11a) dividing the inside of the housing (10) into a plurality of spaces and protrudes from the separation wall (11a) toward the first dehumidifying unit (20) to dehumidify the air that has passed through the first dehumidifying unit (20); and
      a dehumidifier (31) that is disposed on a side of the dehumidifying filter unit (32) to dehumidify the air that has passed through the first dehumidifying unit (20) before the air passes through the dehumidifying filter unit (32).

2. The turbo air blower having waterproof and damp-proof functions as claimed in claim 1, wherein the first and third dehumidifying units (20 and 40) respectively include:
   dehumidifiers (21 and 41) that are disposed on an inner side of the housing (10) and remove humidity from air flowing inside;
   filters (22 and 42) that are disposed on one surface of the dehumidifiers (21 and 41) and filter out foreign substances in the air with humidity removed; and
   humidity blocks (23 and 43) that are disposed in the housing (10) to face the filters (22 and 42) with a predetermined distance therebetween.

3. The turbo air blower having waterproof and damp-proof functions as claimed in claim 1, wherein rain blocks (60) are disposed at the first and second intake ports (14 and 15) respectively, the rain blocks (60) including: a plurality of block members (61) inclined downward and sequentially arranged with a gap therebetween; and discharge guides (62) formed by bending the lower ends of the block members (61) to form longitudinal channels (63) so that water and rainwater flowing down on the block members (61) are collected in the channels (63) to be discharged outside without flowing into the housing (10).

* * * * *